United States Patent
Senatore et al.

(10) Patent No.: US 12,244,651 B2
(45) Date of Patent: Mar. 4, 2025

(54) LAWFUL INTERCEPTION SECURITY

(71) Applicant: Telefonaktiebolaget LM Ericsson (publ), Stockholm (SE)

(72) Inventors: Andrea Senatore, Pellezzano (IT); Giuseppe Amato, Solerno (IT); Francesco Toro, Baronissi (IT); Alessandro Mordacci, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 478 days.

(21) Appl. No.: 15/733,022

(22) PCT Filed: Nov. 7, 2017

(86) PCT No.: PCT/SE2017/051107
§ 371 (c)(1),
(2) Date: Apr. 20, 2020

(87) PCT Pub. No.: WO2019/093932
PCT Pub. Date: May 16, 2019

(65) Prior Publication Data
US 2020/0267189 A1   Aug. 20, 2020

(51) Int. Cl.
*H04L 9/40* (2022.01)
*H04L 9/08* (2006.01)
(Continued)

(52) U.S. Cl.
CPC .......... *H04L 63/306* (2013.01); *H04L 9/0869* (2013.01); *H04L 9/3236* (2013.01); *H04L 63/123* (2013.01); *H04L 69/28* (2013.01)

(58) Field of Classification Search
CPC ............ H04L 63/00; H04L 69/00; H04L 9/00
See application file for complete search history.

(56) References Cited

U.S. PATENT DOCUMENTS 10,298,387 B1 *   5/2019   Good ................... H04L 63/0464
10,505,721 B2 *  12/2019   Dimitrakos ............... H04L 9/08
(Continued)

FOREIGN PATENT DOCUMENTS

| EP | 2566126 A1 * | 3/2013 | ............ H04L 63/30 |
| WO | 2017109272 A1 | 6/2017 | |

OTHER PUBLICATIONS

Author Unknown, "Lawful Interception (LI); Security framework in Lawful Interception and Retained Data environment," European Telecommunications Standards Institute (ETSI), Technical Report (TR) 102 661, Version 1.2.1, Nov. 2009, 46 pages.
(Continued)

*Primary Examiner* — Derrick W Ferris
*Assistant Examiner* — Jeremy Paul Muday
(74) *Attorney, Agent, or Firm* — Withrow & Terranova, PLLC

(57) ABSTRACT

A lawful interception administrative function (LI ADMF) provides a virtual network function (VNF) implemented (i.e. implemented in a cloud infrastructure) LI intercept access point (IAP) only with one-way encrypted targets instead of clear-text targets while keeping the lawful interception triggering capability of the IAP unaffected. The ADMF, being external to the cloud infrastructure in which the IAP is running, executes hashing of targets before the targets are provided to the IAP. The IAP will never receive targets in clear text and thereby greatly reducing the LI security risks.

16 Claims, 9 Drawing Sheets

(51) Int. Cl.
*H04L 9/32* (2006.01)
*H04L 69/28* (2022.01)

(56) References Cited

U.S. PATENT DOCUMENTS

| | | | | |
|---|---|---|---|---|
| 2007/0207854 A1* | 9/2007 | Wolf | ............. | G07F 17/3202 |
| | | | | 463/24 |
| 2012/0219153 A1* | 8/2012 | Bell | ............. | H04L 9/083 |
| | | | | 380/278 |
| 2015/0139087 A1* | 5/2015 | Luft | ............. | H04W 76/11 |
| | | | | 370/329 |
| 2016/0112261 A1* | 4/2016 | Amato | ............. | H04L 63/306 |
| | | | | 709/220 |
| 2016/0253322 A1* | 9/2016 | Li | ............. | G06F 16/137 |
| | | | | 707/747 |

OTHER PUBLICATIONS

Author Unknown, "Lawful Interception (LI); Part 1: Internal Network Interface X1 for Lawful Interception," European Telecommunications Standards Institute (ETSI), Technical Specification (TS) 103 221-1, Version 1.1.1, Oct. 2017, 36 pages.

Author Unknown, "Cyber; Security Aspects for LI and RD Interfaces," European Telecommunications Standards Institute (ETSI), Technical Specification (TS) 103 307, Version 1.3.1, Apr. 2018, 25 pages.

International Search Report and Written Opinion for International Patent Application No. PCT/SE2017/051107, mailed Jul. 31, 2018, 10 pages.

\* cited by examiner

LAWFUL INTERCEPTION SECURITY

This application is a 35 U.S.C. § 371 national phase filing of International Application No. PCT/SE2017/051107, filed Nov. 7, 2017, the disclosure of which is incorporated herein by reference in its entirety.

TECHNICAL FIELD

Embodiments herein relate to security in lawful interception functions deployed as virtualized network functions.

BACKGROUND

Lawful Interception (LI) is a very sensitive business that involves several functions in a telecommunication network. In particular a network function that supports LI is also called Intercept Access Point (IAP). Examples of 3rd Generation Partnership Project (3GPP) network functions that support LI include Mobility Management Entity (MME), Home Subscriber Server (HSS), Packet Data Network Gateway (PDN-GW), Serving Gateway (S-GW) etc.

Such network functions are typically used for several purposes. Hence, bearing in mind the very sensitive context of LI, in order to avoid that LI sensitive data (e.g. information about targets that are being subjected to LI) are disclosed to unauthorized people, several security techniques have been introduced into IAP functions. Such security techniques are mainly based on a separate access control and strict physical security.

When the context becomes one where a network function in realized in a virtualized environment (i.e. a cloud infrastructure implementation) these techniques are usually not applicable. Network Functions Virtualization (NFV) is an emerging requirement for telecommunication since it allows service providers and operators to abstract any type of network services into software that runs on cloud Infrastructure, i.e. software together with deployment instructions in the form of virtual network functions (VNF). For operators and service providers, the "holy grail" of an NFV implementation is the ability to dynamically provision network components, services and applications in a matter of minutes rather than the weeks or months.

However, in NFV environment, tenants and service providers usually belong to different trust domains. NFV's multi-tenancy, multi-vendor, and virtualization features pose unique and specific security and access privilege challenges due to sharing of resources among potentially un-trusted tenants and domains. It can be said that NFV introduces new threats into telecommunication Infrastructures mainly due to the absence of physical security and to the sharing of physical and logical resources.

These threats are exacerbated if the network function acts also as an IAP since some sensitive data (e.g. targets for LI) could be easily read or even modified by an unauthorized user. Access control within the NFV may not be enough if the infrastructure does not offer strong isolation mechanisms or encryption. Indeed, both a malicious tenant and malicious NFV could obtain information of intercepted targets through the infrastructure. Moreover, the use of encryption mechanisms in a virtualized infrastructure requires an appropriate and usually complex key management, such as Trusted Platform Module (TPM) adoption.

SUMMARY

In view of the above, an object of the present disclosure is to overcome drawbacks related to security in LI functions deployed as virtualized network functions.

This object is achieved in a first aspect by a method performed by a LI administrative function (ADMF). The method comprises obtaining a random value and calculating a target hash value using a one-way hash function on a target and the random value. The target identifies a communicating entity that is to be subjected to LI in an IAP in a VNF. The random value and the calculated target hash value are then transmitted to the IAP.

In a second aspect there is provided a method performed by a IAP in a VNF. The method according to this second aspect comprises receiving, from a LI ADMF, a random value and a target hash value. The target hash value is a result of use of a one-way hash function on a target, the target identifying a communicating entity that is to be subjected to LI in the IAP. A message associated with an identity is received by the IAP and a test hash value is calculated, using the one-way hash function on the identity and the random value. The test hash value is then compared with the target hash value and, if the test hash value is equal to the target hash value, then LI is performed on the target.

In other words, an LI ADMF provides an IAP only with one-way encrypted targets instead of clear-text targets while keeping the lawful interception triggering capability of the IAP unaffected.

The methods disclosed herein delegate to a LI ADMF, external to the cloud infrastructure where the IAP is running on, execution of hashing of the targets before the targets are provided to the IAP. The IAP will never receive targets in clear text and thereby greatly reducing the LI security risks. For example, an attack where a fake IAP is created by a malicious cloud administrator in order to get provisioned with targets from ADMF will not end up in actual target disclosure to such a malicious cloud administrator.

It can therefore be said that the "attack surface" of an IAP is reduced by the methods herein and thereby the risk that LI sensitive information is read by unauthorized users is reduced. That is, it is to be remembered that a main security issue is that an operating system (OS) embeds the function and uses locally generated random data for password hashing. In a virtualized OS instance (i.e. a cloud infrastructure), such function and data can be hacked if the cloud infrastructure does not provide the integrity of the OS software and true entropy sources. Such security risk is not acceptable for very sensitive data like LI target identities. An obvious solution would be to enforce the security requirements on the cloud infrastructure but, since it has significant cost in terms of software development, cloud resources consumption and performance impact, it is often not provided at a level required by LI.

In various embodiments, the LI ADMF may obtain an index value that is associated with the random value. The transmitting to the IAP then comprises transmission of the index value that is associated with the random value. In such embodiments, the receiving by the IAP from the ADMF then comprises reception of an index value that is associated with the random value, and further comprised storing the random value in volatile memory and storing the index value and the target hash value in non-volatile memory. The random value is then selected for use in said one-way hash function based on the index value.

In other words, such embodiments provide additional security mechanisms that ensure the targets remain undisclosed even an IAP database, typically stored in non-volatile memory, comprising hashed targets is stolen and off-line processed. (Remembering that a non-volatile database of hashed targets could be stolen and processed off-line in an attempt to "crack" the database" with a brute force mechanism.)

In some embodiments, the LI ADMF may start a timer, subsequent to the obtaining of the random value. When the timer has expired, a further random value and a further index value may be obtained, the further index value being associated with the further random value. A further target hash value may then be calculated using a one-way hash function on the target and the further random value. The further random value, the further index value and the further target hash value may then be transmitted to the IAP. In such embodiments, the IAP receives, from the ADMF, the further random value, the further index value and the further target hash value. Moreover, in such embodiments, the storing in volatile memory comprises storing the further random value and the storing in non-volatile memory comprises storing the further index value and the further target hash value. The selecting in these embodiments comprises selecting the further random value for use in said one-way hash function based on the further index value.

As will be exemplified in more detail below, in various embodiments of the methods the transmission of values by the LI ADMF and the corresponding receiving values by the IAP may be performed by way of one or more X1 protocol messages.

In another aspect, there is provided a LI ADMF device that comprises input/output circuitry, a processor and a memory. The memory may contain instructions executable by the processor whereby the LI ADMF device is operative to obtain a random value, calculate a target hash value using a one-way hash function on a target and the random value, said target identifying a communicating entity that is to be subjected to LI in an IAP in a VNF, and transmit, to the IAP, the random value and the calculated target hash value.

In further aspects there are provided computer programs comprising instructions which, when executed on at least one processor cause a processor to carry out any method according to the aspects described above. In yet further aspects there are provided one or more carriers comprising such computer programs, wherein the carrier is one of an electronic signal, an optical signal, a radio signal and a computer readable storage medium.

These other aspects and embodiments of these further aspects provide the same effects and advantages as summarized above in connection with the methods of the first and second aspects.

DETAILED DESCRIPTION

Figure 1A:
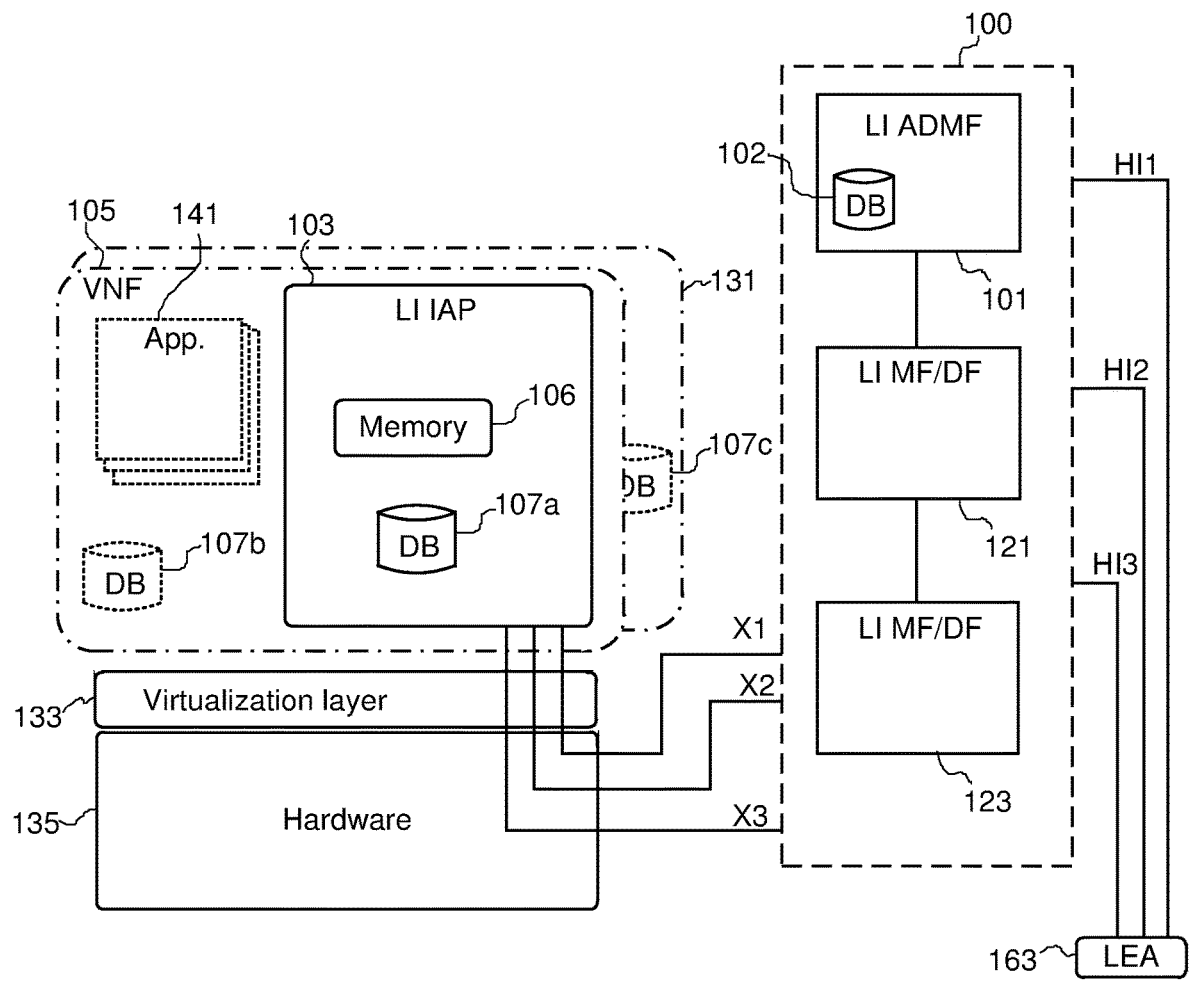
FIG. 1a schematically illustrates a LI context comprising LI functions.
Figure 1B:
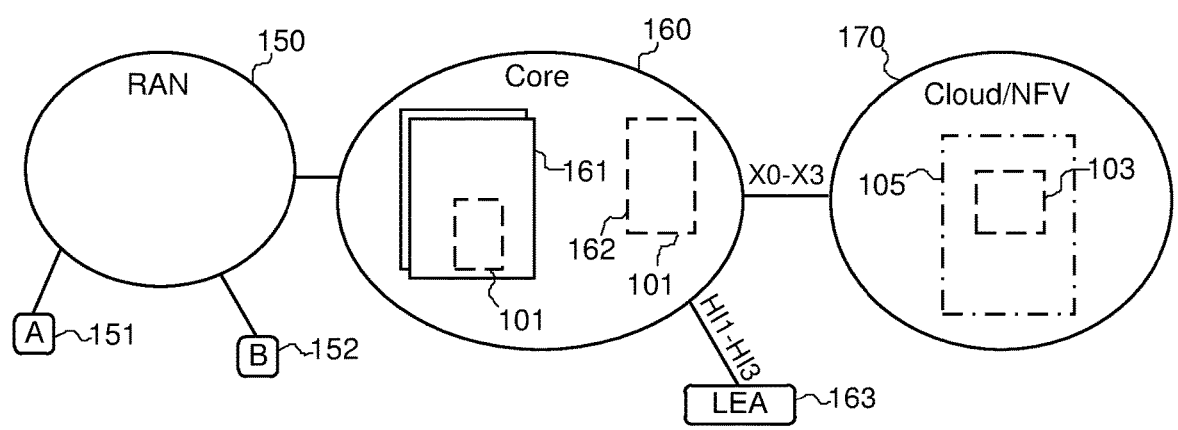
FIG. 1b schematically illustrates an example of interconnected networks comprising LI functions.

Turning first to FIG. 1a and FIG. 1b, embodiments of the present disclosure comprise an LI ADMF 101 and an IAP 103, these two LI functions operating together in a context of LI as will be described in detail below. As is known to the skilled person, LI is a process where a communication network operator shall provide access to intercepted content of communications (CC) and intercept related information (IRI) of mobile targets and services related to the target (e.g. call forwarding) on behalf of law enforcement agencies (LEAs). An LEA provides intercept requests (e.g., lawful authorization or warrant) to the network operator.

Referring to the schematically exemplified interconnected networks in FIG. 1b, a first communicating entity, A, 151 and a second communicating entity, B, 151 are communicating via a radio access network (RAN) 150 that is connected to a core network 160. The RAN 150 and the core network 160 may be operated by a communication network operator that has received a request for LI from a LEA 163 wherein the communicating entity A 151 is a target for the LI requested by the LEA 163. The LI request and subsequent data obtained in the LI process are communicated between the operator's core network 160 and the LEA 163 via so-called HI1, HI2 and HI3 interfaces.

As illustrated in FIG. 1b, the LI ADMF 101 may be realized in the core network 160, either in a form of one among many functions within one or more network nodes 161 or in a form of a dedicated host or node 162. As illustrated in FIG. 1a, the LI ADMF 101 comprises a database 102 for non-volatile storage of information. The ADMF 101 may be realized in a node 100 that also comprises mediation and distribution functions (MF/DF) 121, 123. No detailed description of the MF/DF 121, 123 will be provided herein as they are not essential for the various aspects discussed herein.

The IAP 103 may be realized in a VNF 105 within an NFV architecture, or "cloud", 170. The IAP 103 operates in connection with the LI ADMF 101 in the core network 160 via so-called X-interfaces. Needless to say, the core network 160 and the RAN 150 may comprise a large number of interconnected entities that are outside the scope of the present disclosure and these will, consequently, not be discussed further herein. With regard to the VNF 105 within which the IAP 103 resides, FIG. 1a illustrates that (typically together with a plurality of further VNF's 131) it runs on hardware (e.g. a so-called hardware platform) 135 via a virtualization layer 133. As indicated, the VNF 105 may comprise one or more applications 141 in addition to the IAP 103. One or more of these applications 141 may also be in the form of an IAP within the VNF 105. Furthermore, one or more of the further VNF's 131 may also comprise one or more IAP's similar to the IAP 103. Details regarding the operation of the VNF 105 in relation to the virtualization layer 133 and the hardware (e.g. computer servers) 135 are outside the scope of the present disclosure.

Continuing with reference to FIG. 1a, the LI ADMF 101 and the LI MF/DF 121, 123 communicates with the IAP 103 over an X interface (X1, X2 and X3) and with the LEA 163 via an HI interface (HI1, HI2 and HI3). The LI ADMF 101 also communicates "internally" with the MF/DF functions 121, 123.

The IAP 103 comprises a volatile memory 106 and a non-volatile memory 107a. As indicated in FIG. 1a, non-volatile memories 107b, 107c may alternatively, in contrast to being comprised in the IAP 103, contain data used by or associated to IAP 103 by being comprised in the VNF 105 or in one or more of the further VNF's 131.

Figure 2:
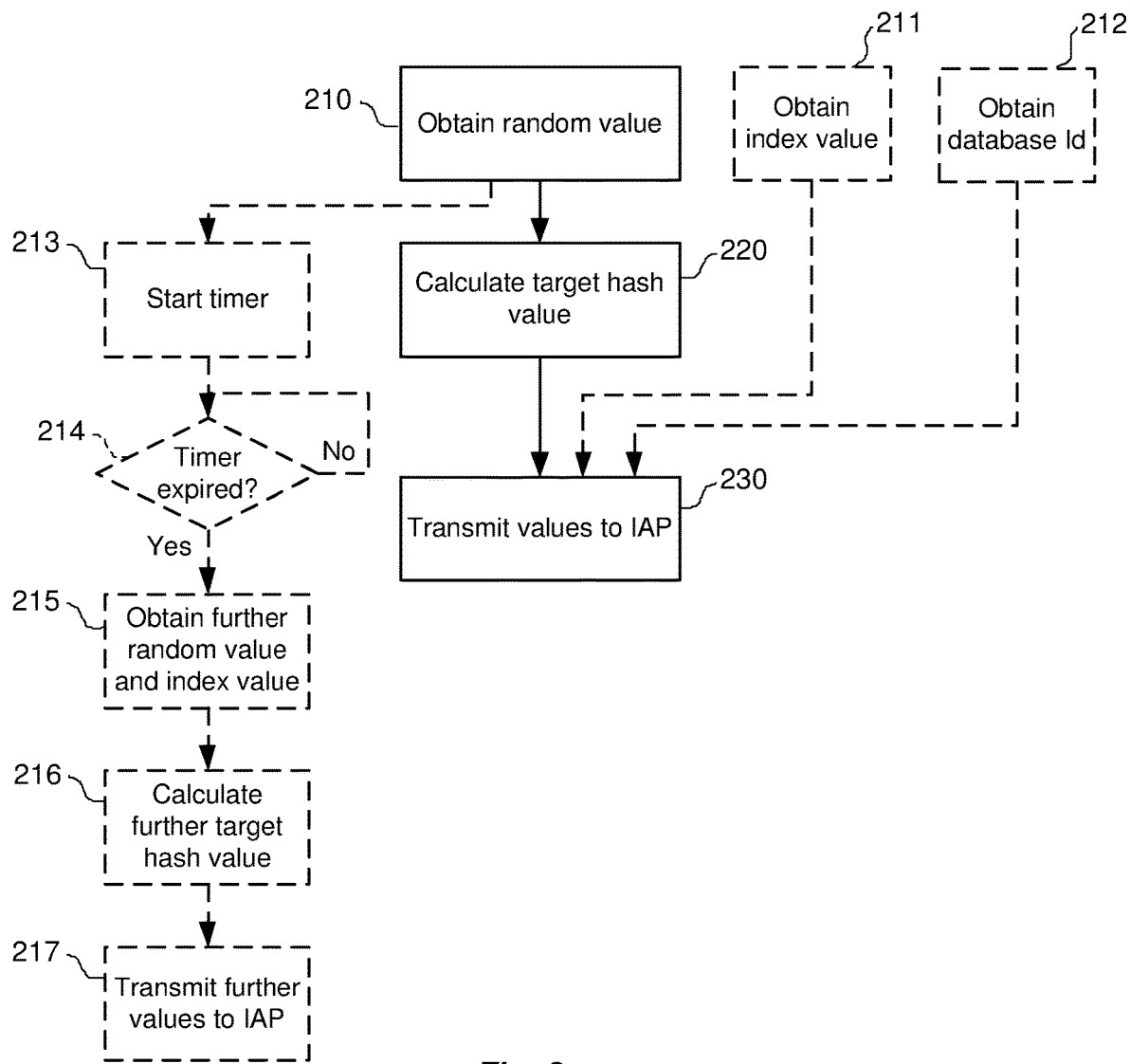
FIG. 2 is a flowchart of embodiments of a method performed by an LI ADMF.

Turning now to FIG. 2 and with continued reference to FIGS. 1a and 1b, embodiments of a method performed by the LI ADMF 101 will be described in some detail. The method comprises a number of actions as follows.

Action 210

A random value is obtained by the LI ADMF 103. For example, this random value may be obtained, as the skilled person will realize, from a random number generator (not illustrated) within the VNF 105, such random number generator utilizing an entropy source within the VNF 105 itself or within the virtualization layer 133 or the hardware platform 135.

Action 220

A target hash value is calculated using a one-way hash function on a target and the random value, said target identifying a communicating entity 151 that is to be subjected to LI in the IAP 103 in the VNF 105. As the skilled person will realize, any procedure of selecting the target is outside the scope of the present disclosure.

Action 230

The random value and the calculated target hash value is then transmitted to the IAP 103.

In some embodiments, as illustrated by action 211, an index value that is associated with the random value is obtained. In such embodiments, the transmitting in action 230 to the IAP 103 comprises transmission of the index value that is associated with the random value.

In some embodiments, as illustrated by action 212, a database identifier for identifying a non-volatile memory 107 associated with the IAP 103 is obtained. In such embodiments, the transmitting in action 230 to the IAP 103 comprises transmission of the database identifier.

As will be described in more detail below, in some embodiments the transmitting in action 230 to the IAP 103 comprises a first connection procedure that comprises transmission of an X1 protocol message that comprises the database identifier the random value, and the index value. In some embodiments, the transmitting in action 230 to the IAP 103 comprises a target provisioning procedure that comprises transmission of an X1 protocol message that comprises the index value, and the target hash value.

Some embodiments include a procedure involving a timer as illustrated in FIG. 2 by actions 213 to 217:

Action 213

Subsequent to the obtaining in action 210 of the random value, a timer is started.

Action 215

When the timer has expired in a checking timer action 214, a further random value and a further index value are obtained. The further index value is associated with the further random value.

Action 216

A further target hash value is calculated using a one-way hash function on the target and the further random value that was obtained in action 215. As the skilled person will realize, the one-way hash function may be any suitable function, such as any of the algorithms defined in the European Telecommunications Standards Institute (ETSI) technical specification (TS) 103 307 chapter 5.2 or in ETSI technical report (TR) 102 661 Annex D.

Action 217

The further random value, the further index value and the further target hash value are transmitted to the IAP 103.

As will be described in more detail below, in some embodiments the transmitting to the IAP 103 in action 217 may comprise an updating procedure that comprises transmission of an X1 protocol message that comprises the further random value, the further index value and the further target hash value.

Figure 3:
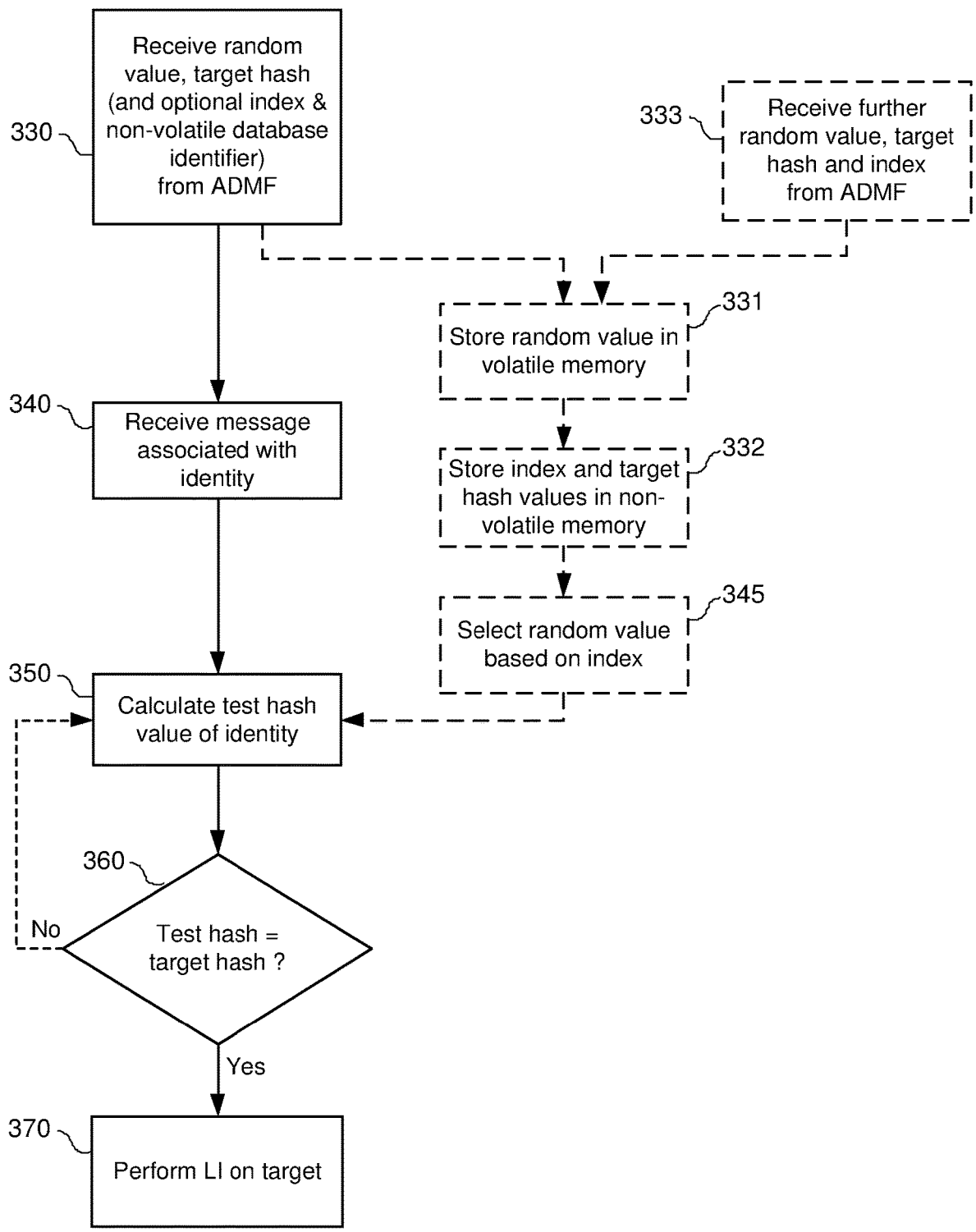
FIG. 3 is a flowchart of embodiments of a method performed by an IAP.

Turning now to FIG. 3, and with continued reference to FIGS. 1a and 1b and FIG. 2, embodiments of a method performed by the IAP 103 in the VNF 105 will be described in some detail. The method comprises a number of actions as follows.

Action 330

A random value and a target hash value is received from a LI ADMF 101. The target hash value is a result of use of a one-way hash function on a target, said target identifying a communicating entity 151 that is to be subjected to LI in the IAP.

Action 340

A message associated with an identity is received. For example, a message may be in the form of a communication session initialization protocol (SIP) message like a SIP INVITE in the Internet protocol (IP) multimedia subsystem (IMS) domain, where the identity is the used uniform resource identifier (URI), or simply a Transmission Control Protocol (TCP) packet, where the identity is a destination or originating IP address in the packet header.

Action 350

A test hash value is calculated using said one-way hash function on the identity and the random value. The action is repeated for each valid random value in the non-volatile memory 107 in the IAP 103.

Action 360

The test hash value is compared with the target hash value. Each test hash value is compared only with the target hash value calculated with the same random value.

Action 370

If, as found in action 360, the test hash value is equal to the target hash value, then LI is performed on the target. Further details regarding LI on the target are outside the scope of the present disclosure.

In some embodiments, the receiving in action 330 from the ADMF comprises reception of an index value that is associated with the random value. In such embodiments the random value is stored, in action 331, in volatile memory 106 whereas the index value and the target hash value are stored, in action 332, in non-volatile memory 107. The random value for use in said one-way hash function (in action 350) is then selected, in action 345, based on the index value. In some of these embodiments, the receiving in action 330 from the ADMF comprises reception of a database identifier for identifying the non-volatile memory 107. In these embodiments, the storing in action 332 comprises storing in non-volatile memory 107 identified by the database identifier.

As will be described in more detail below, in some embodiments the receiving in action 330 from the ADMF 101 comprises a first connection procedure that comprises reception of an X1 protocol message that comprises the database identifier the random value, and the index value. In some embodiments, the receiving in action 330 from the ADMF 101 comprises a target provisioning procedure that comprises reception of an X1 protocol message that comprises the index value, and the target hash value.

In some embodiments, a further random value, a further index value and a further target hash value is received, in action 333, from the ADMF 101. In these embodiments, the storing in action 331 in volatile memory 106 comprises storing the further random value and the storing in action 332 in non-volatile memory 107 comprises storing the further index value and the further target hash value. The selecting in action 345 then comprises selecting the further random value for use in said one-way hash function based on the further index value.

As will be described in more detail below, in some embodiments the receiving from the ADMF 101 in action 333 may comprise an updating procedure that comprises reception of an X1 protocol message that comprises the further random value, the further index value and the further target hash value.

Turning now to FIGS. 4*a-e*, and with continued reference to FIGS. 1 to 3, further embodiments of methods performed by the ADMF 101 and the IAP 103 will be presented. The embodiments to be presented involve communication wherein the X1 protocol is used by the ADMF 101 to provision LI targets on IAPs such as the IAP 103. Those LI targets are stored in a database either located into the IAP or shared among several IAPs, as exemplified in FIG. 1*a* by the non-volatile memory 107*a-c*.

As concerns the X1 protocol the present disclosure introduces the following new elements:
  LI DB id: a unique identifier of LI targets database on IAPs such as the non-volatile memory 107*a-c* associated with the IAP 103.
  Nonce: this is a random value generated by the ADMF 101, e.g. the random value obtained in action 210 in the embodiments described above. The Nonce is concatenated with targets to generate "hash target".
  NonceIndex: an index generated by the ADMF to differentiate Nonces, e.g. the index value obtained in action 211 in the embodiments described above.
  Hashed-target: this is an additional target type that specifies that targets stored in a database are hashed.
  Wildcard-regex: a conditional element. It is used to report the regular expression to apply if partial target is used (e.g. incomplete numbers)

These new elements are used in messaging between the ADMF 101 and the IAP 103 using the X1 protocol in the following procedures:
  First connection procedure;
  Target provisioning procedure;
  IAP restart procedure;
  Handling of hash collisions procedure;
  Use of targets with wildcards procedure;
  Target matching on IAP procedure;

A precondition for a secure adoption of these elements using the X1 protocol is the use of mutual authentication and encryption on the X1 channel between the ADMF 101 and the IAP 103. For example, the already known secure shell (SSH) or IP security (IPSEC) protocol may be used, and therefore not discussed further herein.

Figure 4A:
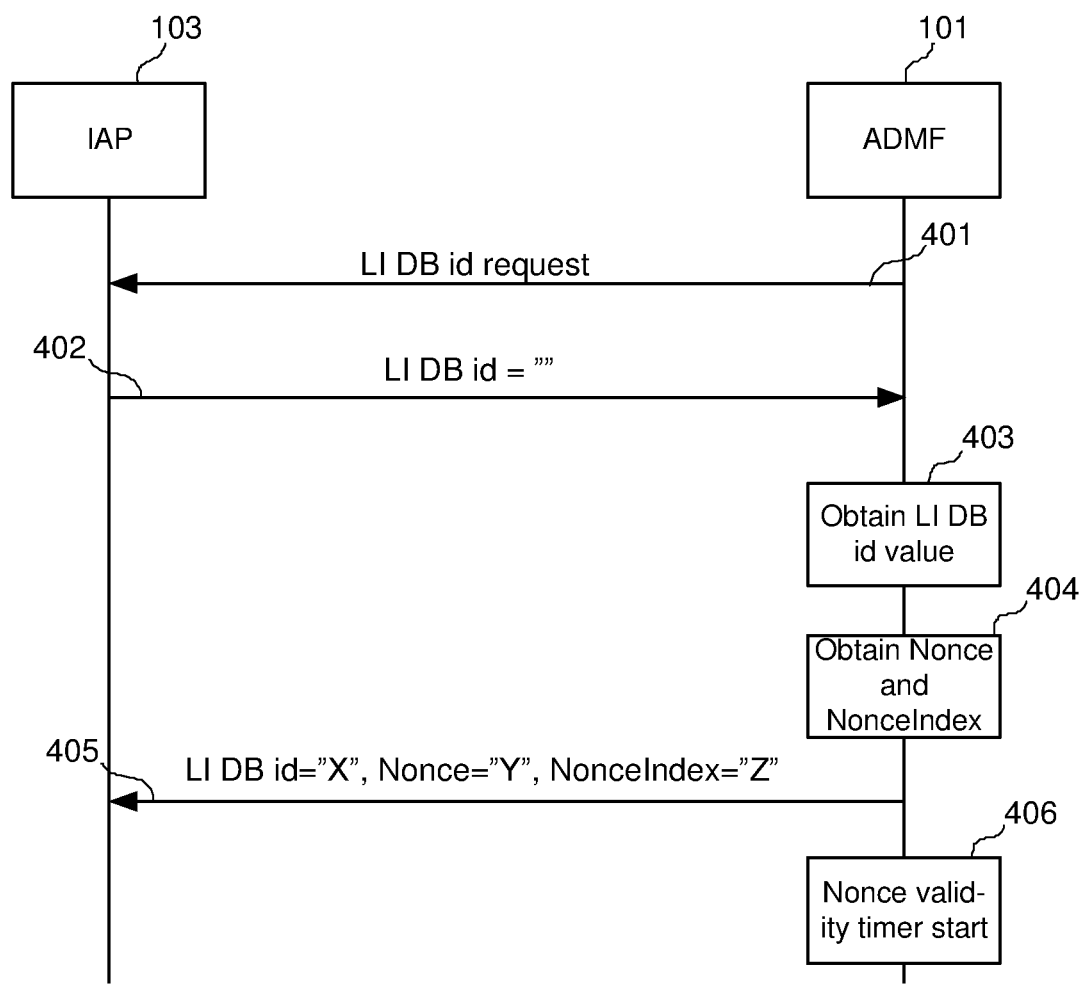
FIGS. 4a-e are signaling diagrams of embodiments involving an LI ADMF and an IAP, FIG. 5 schematically illustrates an LI ADMF, FIG. 6 schematically illustrates an LI ADMF, and FIG. 7 schematically illustrates a hardware platform for NFV.

Now with reference to the signalling diagram in FIG. 4*a*, a first connection procedure will be described:

Whenever the ADMF 101 establishes for the first time a connection with the IAP 103 on the X1 interface, the following actions are performed:
  401. The ADMF 101 requests the IAP 103 to provide the LI DB id.
  402. The IAP 103 sends a response containing the LI DB id element. Since it is the first connection between the IAP 103 and the ADMF 101, this element is set to a null value.
  403. At reception of the response containing a null LI DB id the ADMF 101 obtains, e.g. by generating, a unique LI DB id value.
  404. The ADMF 101 obtains, e.g. by generating, a random Nonce and an associated NonceIndex. The Nonce will be used to hash the targets and the NonceIndex to indicate what Nonce is used, since more Nonces can be used into a single database.
  405. The ADMF 101 sends to the IAP 103 a new message containing the LI DB Id, Nonce and NonceIndex. The IAP 103 does not store the Nonce together with hashed targets in the (non-volatile) database. The Nonce is just stored into volatile memory and available only if the IAP 103 is up and running.
  406. The ADMF 101 starts a Nonce validity timer. This is a configurable timer that establishes how long a Nonce can be used before a new one shall be generated (as will be discussed in some more detail below in connection with the target matching procedure).

Figure 4B:
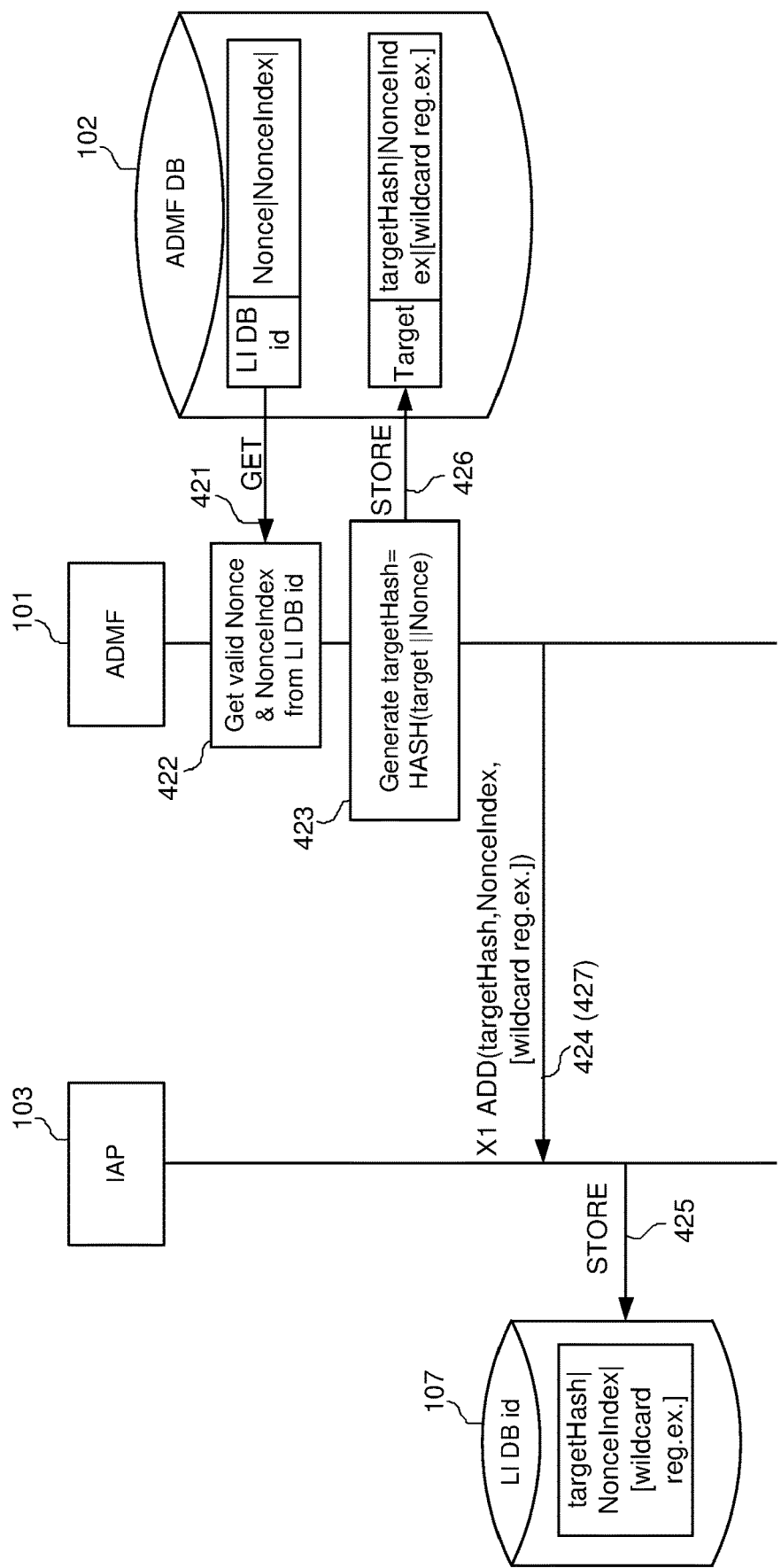

Now with reference to the signalling diagram in FIG. 4*b*, a target provisioning procedure will be described:

In order to manage addition/removal of a warrant on the IAP 103 (a warrant being an authorized request of LI of a communicating entity, such as the entity 151, identified through a target), the ADMF 101 shall keep the association among each LI DB id and the related Nonce and NonceIndex. This is kept in the database 102 and illustrated in table 1 below. Indeed, for each LI DB id there can be more than one Nonce since a new Nonce is generated whenever the Nonce validity timer expires.

TABLE 1

| LI DB id | [Valid Nonce] + [NonceIndex] | [Expired Nonce] + [NonceIndex] |
| --- | --- | --- |
| 1 | [1rdfrd4e45] + [3] | — |
| 1 | — | [njicygyi55] + [2] |
| 1 | — | [defuehoiyty7] + [1] |

Moreover, in order to correctly manage the warrants and since the ADMF 101 uses different hashes for the same target on different LI DB id, it shall keep the following information into its own database 102 of each target and for each LI DB id (usually meaning different IAPs unless several IAPs use the same database for targets):
  hashed target values
  NonceIndex
  optionally a wildcard regular expression (wildcard-regex), as will be described in some more detail below.
This is exemplified below in table 2.

TABLE 2

| Target | LI DB id 1 | LI DB id 2 | ... | LI DB id N |
| --- | --- | --- | --- | --- |
| Target 1 | targetHash11/ NonceIndex11 \| [wildcard-regex] | targetHash12/ NonceIndex12 \| [wildcard-regex] | ... | HashedTarget1N/ NonceIndex1N \| [wildcard-regex] |
| Target 2 | targetHasht21/ NonceIndex21 \| [wildcard-regex] | targetHash22/ NonceIndex22 \| [wildcard-regex] | ... | HashedTarget2N/ NonceIndex2N \| [wildcard-regex] |
| ... | ... | ... | | ...... |
| Target M | targetHashM1/ NonceIndexM1 \| [wildcard-regex] | targetHashM2/ NonceIndexM2 \| [wildcard-regex] | ... | HashedTargetMN/ NonceIndexMN/ [wildcard-regex] |

When the ADMF 101 is to add a warrant having a new target on an established connection towards the IAP 103, i.e. provide a target to the IAP 103, the following actions are performed:
  421. The ADMF 101 obtains, i.e. retrieves, the LI DB id associated to the IAP from the database 102;
  422. From LI DB id the ADMF 101 obtains, from the database 102, the current valid Nonce and the related NonceIndex (cf. table 1).
  423. The ADMF 101 calculates the target hash: targetHash=HASH(target||valid Nonce).

424. The ADMF 101 sends on the X1 interface a new warrant activation message containing the targetHash and the NonceIndex.

425. The IAP 103 stores the targetHash and the NonceIndex into its database 107 (i.e. any of non-volatile memories 107*a-c*).

426. The ADMF 101 stores into its database 102 the targetHash and the NonceIndex (cf. table 2).

427. Optionally, as will be described in more detail below, if the target is a "partial target" the ADMF 101 sends on X1 and stores into its database 102 also the wildcard regular expression related to the target (cf. table 2).

Figure 4C:
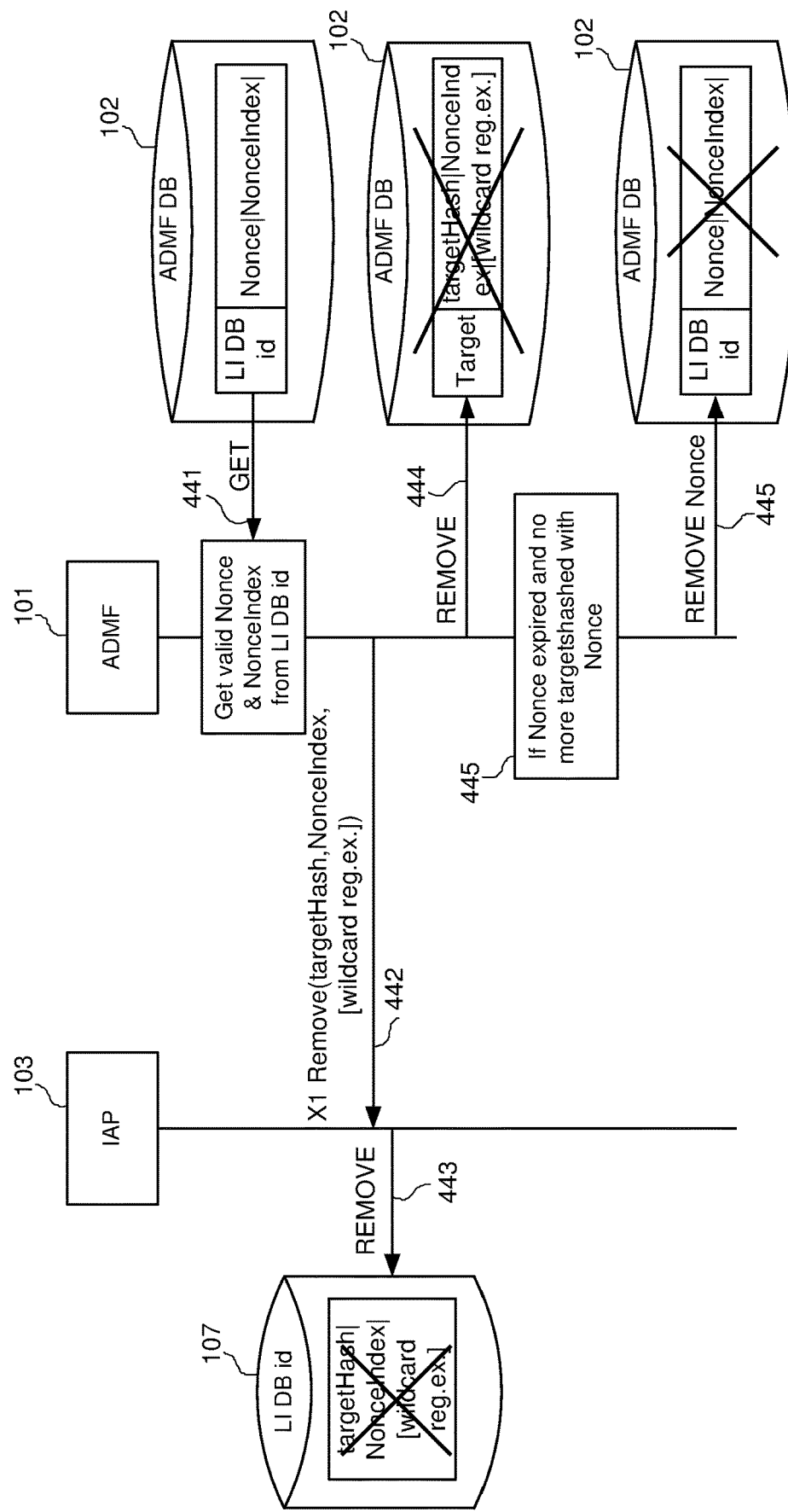

Turning now to FIG. 4*c*, when the ADMF 101 is to remove an existing warrant on an established connection towards the IAP 103, the following actions are performed:

441. Starting from target (cf. table 2) the ADMF 101 retrieves the targetHash and the NonceIndex from its database 102 (optionally retrieving also wildcard regular expression).

442. The ADMF 101 sends on the X1 interface a warrant termination message containing the targetHash and the NonceIndex, (optionally sending also wildcard regular expression).

443. The IAP 101 removes the targetHash and the NonceIndex from its database 107 (optionally removing also wildcard regular expression);

444. The ADMF 101 removes the targetHash and the NonceIndex from its database 102 (optionally also removing wildcard regular expression) (cf. table 2Fel! Hittar inte referenskålla.).

445. If the Nonce is expired and there are no more targets in the database 102 that are hashed with this Nonce, the ADMF 101 removes Nonce and NonceIndex from its database 102 (cf. table 1).

Figure 4D:
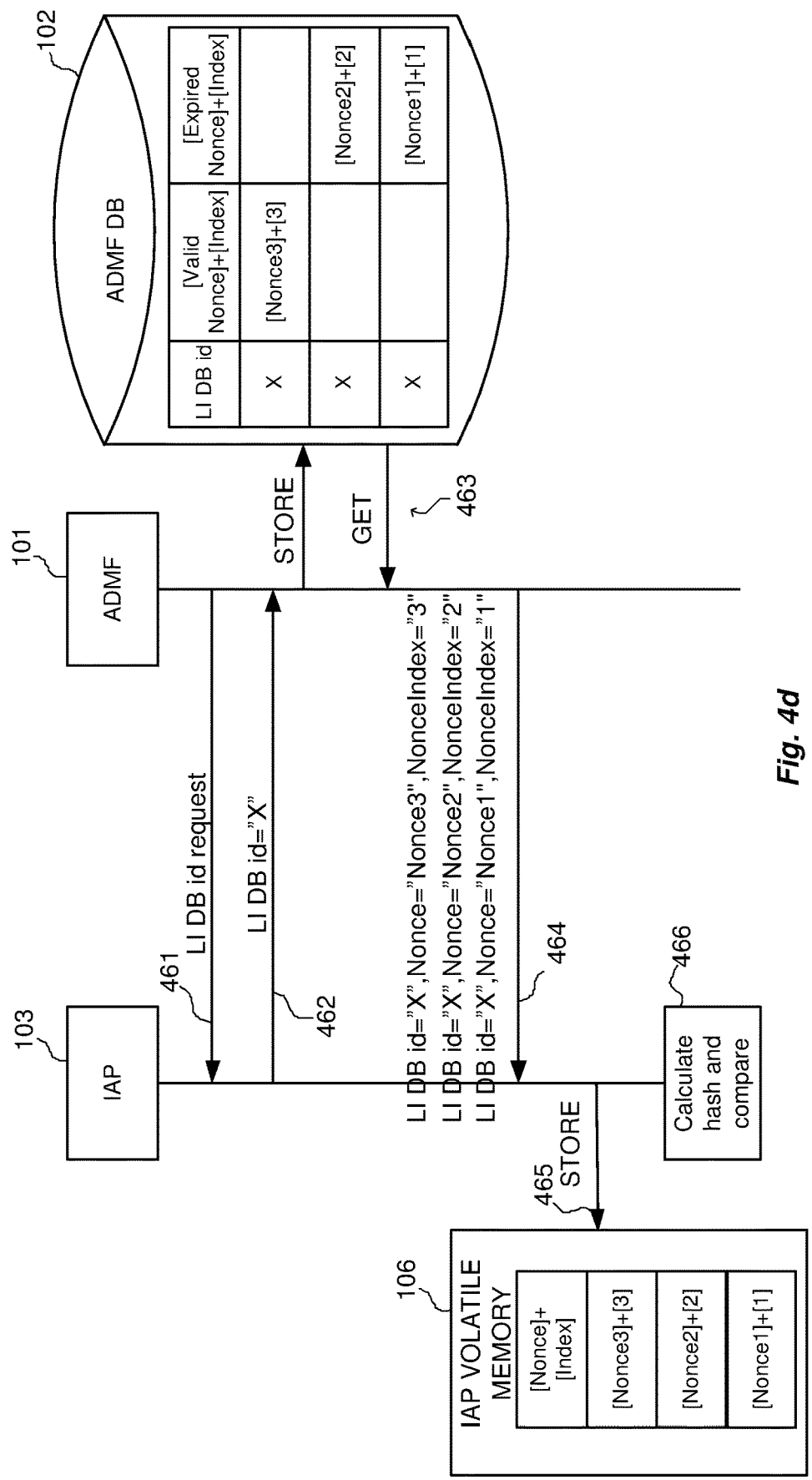

Now with reference to FIG. 4*d*, an IAP restart procedure will be described. Such an IAP restart procedure has an advantage in that the LI database (i.e. non-volatile memory 107) is safe and can't be cracked even if is stolen. Since the IAP 103 keeps each Nonce value only in volatile memory, if it restarts all Nonces are lost. As described above, this renders the IAP 103 database 107 safe and can't be cracked even if it is stolen. So, the ADMF 101 takes care to provide the IAP 103 with all Nonces whenever the connection is re-established.

In particular, the following actions may be performed for restarting the IAP 103:

461. The ADMF 101 re-establishes the connection with the IAP 103 on the X1 interface by means of a message that requests the IAP 103 to provide the LI DB id.

462. The IAP 103 sends, as described above, a message containing the LI DB id element. Since it is not the first connection between IAP 103 and ADMF 101 this element contains the LI database identification value.

463. Starting from the received LI database identification value, the ADMF 101 retrieves all Nonces and the related NonceIndexes (cf. table 2 above).

464. The ADMF 101 sends the Nonces and the related NonceIndexes back to the IAP 103.

465. Having received the Nonces and the related NonceIndexes, the IAP 103 stores them in the volatile memory 106.

466. The IAP 103 calculates hash values of each user and compares it with stored targetHash for matching, as described above.

Figure 4E:
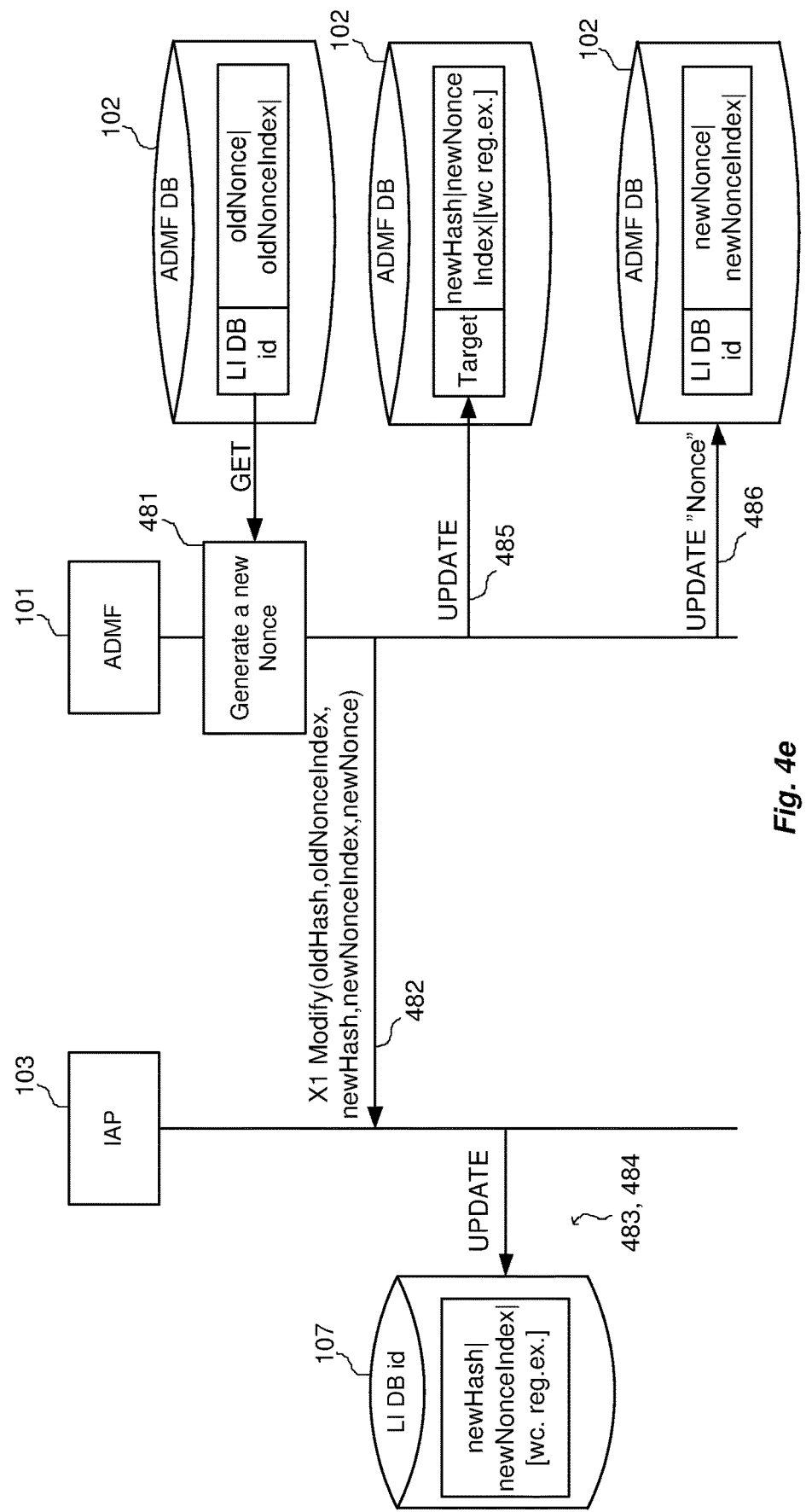

Now with reference to FIG. 4*e*, a hash collision procedure will be described. Although the use of a good hashing algorithm, e.g. Secure Hash Algorithm (SHA-) 512, should guarantee a very low probability of having a conflict in the form of a hash collision, it could happen that two or more identities (an identity is considered a target if there exists a warrant for LI) can have to the same hash value of an existing target. So, there is a need of mechanism to handle these conflicts.

HASH(identity *X*‖valid Nonce)=HASH(target *Y*‖valid Nonce)=CollisionHash

Example—Identity X and Target Y have the Same Hash Value (i.e. CollisionHash)

In particular, if during a target matching procedure (see below) an identity's hash matches with a hash stored into the IAP's 103 database 107, then the IAP 103 starts to intercept this identity.

However, when a mediation function in the MF/DF 121 in the ADMF 101 receives the result of interception (i.e. IRI and CC) it can verify if the identity is really a target since the mediation function keeps the relationship between targets and the related hash values (cf. table 2 aboveFel! Hittar inte referenskålla.).

If the identity is not a target, then the ADMF 101 performs the actions:

481. The mediation function in the MF/DF 121 in the ADMF 101 discards IRI and CC related to the identity not intercepted;

482. Sends a MODIFY message on X1 interface to modify the current Nonces with new ones;

When the IAP 103 receives the MODIFY message:

483. Removes from the database LI DB 107 all (oldHash|oldNonceIndex) and inserts new (newHash+newNonceIndex).

484. From now on the IAP will use this new hash for target matching.

485. The ADMF 101 updates the association of the target with newHash and newNonceIndex in the ADMF database 102.

486. The ADMF 101 updates the association of the database LI DB Id to newNonceIndex and newNonce in the ADMF database 102.

With regard to target matching performed by the IAP 103, e.g. as described above in connection with FIG. 3, in order to verify if a user, e.g. the entity 151, is monitored the IAP 103 performs hashing of the identity of one or more messages originating from the user with all valid Nonces for a given LI DB id (i.e. non-volatile memory 107 in the IAP 103) and then queries the LI DB id for the hash. If the hash is present then the identity need to be monitored (i.e. it is a target for LI), otherwise no monitoring is needed. In case a lot of Nonces for a given LI DB id are in use, then the number of hashings to perform by the IAP 103 could be significant. Hence, in some embodiments, a Nonce replacing algorithm may be performed. Such an algorithm may be based on the following two configurable parameters:

Nonce time expiration

Max Nonces number per LI DB id

When a Nonce is generated a Nonce validity timer is started. This timer ensures the Nonces are used only for a limited time (i.e. a predefined validity period) and afterwards being replaced with new Nonces. When the timer expires, the ADMF 101 generates a new Nonce and new NonceIndex and stores it into its' database 102 as a valid Nonce. The previous Nonce is then moved as expired Nonce (cf. table 1 above). In addition, the ADMF 101 will "upgrade" the existing targets with new Nonces after the validity period and under the condition that the number of Nonces associated to a certain LI DB ID doesn't exceed a maximum value. In this way, a good tradeoff between security and performances can be obtained.

As discussed briefly above, targets may be defined using wildcards. This technique allows a flexible and future proof mechanism that is able to support all possible targets created with wildcards. The IAP 103 performs a procedure as follows.

A "wildcard-regex" is formed by two complementary regular expressions (Rx1 and Rx2). A first match is performed between a received target and the RX1 regular expression. If this match is successful the RX2 regular expressions used to remove the variable part from the target and consequently generate the hash value with which to perform the matching on the target database (i.e. LI DB non-volatile memory 107 in the IAP 103). In case of a hash matching, the LI operation is performed by the IAP 103, otherwise not.

An example of the wildcard handling procedure that is easy to understand is as follows:

A target using wildcards may be expressed as "123???56*@domain.com".

The hash on LI DB will be generated on the fixed part (12356@domain.com) using the valid Nonce. In addition, the wildcard-regex record in the LI DB will be filled with the complementary regular expressions built as follows:

RX1="(???)(???)(??)(*)(@domain.com)"
RX2="$1$3$5".

During traffic LI analysis, e.g. during actions 350, 360 and 370 described above, the IAP 103 will make the first match on RX1. If it is successful RX2 is used to remove the variable part and generate the hash that must be matched with the LI DB. If the match is successful, then the LI operation is performed.

More in detail, examples with real number may be as follows:

Wildcard Procedure Example 1:
345000561111@domain.com=>match with RX1 successful=>substitution with RX2
produce: 34556@domain.com=>calculated hash not found in LI DB=>No, LI is not performed.

Wildcard Procedure Example 2:
123000561111@domain.com=>match with RX1 ok=>substitution with RX2 produce:
12356@domain.com=>calculated hash found in LI DB=>Yes, LI is performed.

Figure 5:
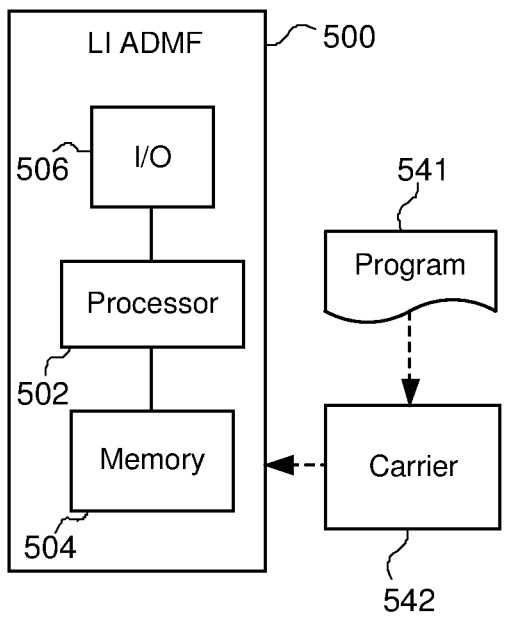

Turning now to FIG. 5, a LI ADMF device 500 will be described in some detail. The LI ADMF device 500, which may correspond to the LI ADMF device 101 in FIG. 1*a-b*, comprises input/output circuitry 506, a processor 502 and a memory 504. The memory 504 contains instructions executable by the processor 502 whereby the LI ADMF device 500 is operative to:

obtain a random value,
calculate a target hash value using a one-way hash function on a target and the random value, said target identifying a communicating entity that is to be subjected to LI in an intercept access point, IAP, in a virtual network function, VNF, and
transmit, to the IAP, the random value and the calculated target hash value.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments, the LI ADMF device 500 is operative to obtain an index value that is associated with the random value and operative such that the transmitting to the IAP comprises transmission of the index value that is associated with the random value.

In some embodiments, the LI ADMF device 500 is operative to obtain a database identifier for identifying a non-volatile memory associated with the IAP, and operative such that the transmitting to the IAP comprises transmission of the database identifier.

In some embodiments, the LI ADMF device 500 is operative such that the transmitting to the IAP comprises a first connection procedure that comprises transmission of an X1 protocol message that comprises the database identifier, the random value, and the index value.

In some embodiments, the LI ADMF device 500 is operative such that the transmitting to the IAP comprises a target provisioning procedure that comprises transmission of an X1 protocol message that comprises the index value, and the target hash value.

In some embodiments, the LI ADMF device 500 is operative to start, subsequent to the obtaining of the random value, a timer, operative to obtain, when the timer has expired, a further random value and a further index value, said further index value being associated with the further random value, operative to calculate a further target hash value using a one-way hash function on the target and the further random value, and operative to transmit, to the IAP, the further random value, the further index value and the further target hash value.

In some embodiments, the LI ADMF device 500 is operative such that the transmitting to the IAP comprises an updating procedure that comprises transmission of an X1 protocol message that comprises the further random value, the further index value, and the further target hash value.

Figure 6:
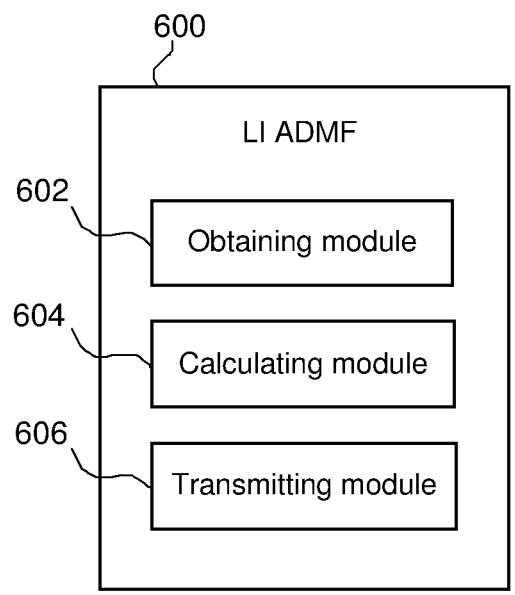

Turning now to FIG. 6, a LI ADMF device 600 will be described in some detail. The LI ADMF device 600, which may correspond to the LI ADMF device 101 in FIG. 1*a-b*, comprises:

an obtaining module 602 configured to obtain a random value,
a calculating module 604 configured to calculate a target hash value using a one-way hash function on a target and the random value, said target identifying a communicating entity that is to be subjected to LI in an intercept access point, IAP, in a virtual network function, VNF, and
a transmitting module 606 configured to transmit, to the IAP, the random value and the calculated target hash value.

The LI ADMF device 600 may comprise further modules that are configured to perform in a similar manner as, e.g., the LI ADMF device 500 described above in connection with FIG. 5.

Figure 7:
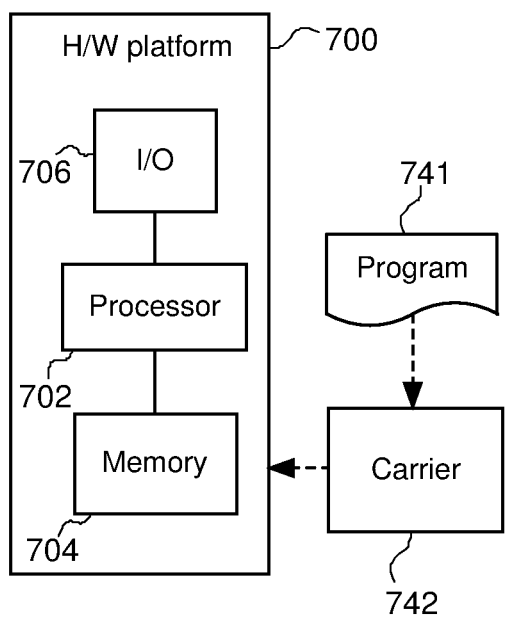

Turning now to FIG. 7, a hardware platform 700 will be described in some detail. The hardware platform 700, which may correspond to the hardware 135 in FIG. 1*a*, comprises input/output circuitry 706, a processor 702 and a memory 704. The memory 704 contains instructions executable by the processor 702 whereby the processor 702 is operative to perform a lawful interception, LI, intercept access point, IAP, in a virtual network function, VNF. Specifically, the processor 702 is operative to:

receive, from a LI administrative function, ADMF, a random value and a target hash value, said target hash value being a result of use of a one-way hash function on a target, said target identifying a communicating entity that is to be subjected to LI in the IAP, receive a message associated with an identity, calculate a test hash value using said one-way hash function on the identity and the random value, compare the test hash value with the target hash value and, if the test hash value is equal to the target hash value, then perform LI on the target.

The instructions that are executable by the processor 702 may be software in the form of a computer program 741. The computer program 741 may be contained in or by a carrier 742, which may provide the computer program 741 to the memory 704 and processor 702. The carrier 742 may be in any suitable form including an electronic signal, an optical signal, a radio signal or a computer readable storage medium.

In some embodiments, the processor 702 is operative such that the receiving from the ADMF comprises reception of an index value that is associated with the random value, and further operative to:

storing the random value in volatile memory, store the index value and the target hash value in non-volatile memory, and select the random value for use in said one-way hash function based on the index value.

In some embodiments, the processor 702 is operative such that the receiving from the ADMF comprises reception of a database identifier for identifying the non-volatile memory, and operative such that the storing comprises storing in non-volatile memory identified by the database identifier.

In some embodiments, the processor 702 is operative such that the receiving from the ADMF comprises a first connection procedure that comprises reception of an X1 protocol message that comprises the database identifier, the random value, and the index value.

In some embodiments, the processor 702 is operative such that the receiving from the ADMF comprises a target provisioning procedure that comprises reception of an X1 protocol message that comprises the index value, and the target hash value.

In some embodiments, the processor 702 is operative to:

receive, from the ADMF, a further random value, a further index value and a further target hash value, and operative such that the storing in volatile memory comprises storing the further random value, and operative such that the storing in non-volatile memory (107) comprises storing the further index value and the further target hash value, and operative such that the selecting comprises selecting the further random value for use in said one-way hash function based on the further index value.

In some embodiments, the processor 702 is operative such that the receiving from the ADMF comprises an updating procedure that comprises reception of an X1 protocol message that comprises the further random value, the further index value, and the further target hash value.

The invention claimed is:

1. A method performed by a lawful interception, LI, administrative function, ADMF, the method comprising:

obtaining a random value from a random number generator within a virtual network function, VNF, obtaining an index value that is associated with the random value, calculating a target hash value using a one-way hash function on a target and the random value, said target identifying a communicating entity that is to be subjected to LI in an intercept access point, IAP, in the VNF, obtaining a database identifier for identifying a non-volatile memory associated with the IAP, and transmitting, to the IAP, the random value, the index value, the database identifier, and the calculated target hash value.

2. A non-transitory computer readable storage medium, comprising a computer program which comprises instructions which, when executed on at least one processor in an LI ADMF device, cause the LI ADMF device to carry out a method according to claim 1.

3. A non-transitory computer readable medium, comprising a computer program which comprises instructions which, when executed on at least one processor, cause the processor to carry out a method according to claim 1.

4. The method of claim 1, wherein the transmitting to the IAP comprises a first connection procedure that comprises transmission of an X1 protocol message that comprises:

the database identifier, the random value, and the index value.

5. The method of claim 4, wherein the transmitting to the IAP comprises a target provisioning procedure that comprises transmission of an X1 protocol message that comprises:

the index value, and the calculated target hash value.

6. The method of claim 1, comprising:

starting, subsequent to the obtaining of the random value, a timer, obtaining, when the timer has expired, a further random value and a further index value, said further index value being associated with the further random value, calculating a further target hash value using a one-way hash function on the target and the further random value, and transmitting, to the IAP, the further random value, the further index value and the further target hash value.

7. A method performed by a lawful interception, LI, intercept access point, IAP, in a virtual network function, VNF, the method comprising:

receiving, from a LI administrative function, ADMF, a random value, an index value, a database identifier and a target hash value, said index value being associated with the random value, said database identifier that identifies a non-volatile memory associated with the IAP, and said target hash value being a result of use of a one-way hash function on: (a) a target, said target identifying a communicating entity that is to be subjected to LI in the IAP, and (b) the random value obtained by the ADMF from a random number generator within the VNF;

receiving a message associated with an identity;

calculating a test hash value using said one-way hash function on the identity and the random value;

comparing the test hash value with the target hash value and, if the test hash value is equal to the target hash value; and performing LI on the target.

8. The method of claim 7, further comprising:

storing the random value in volatile memory, storing the index value and the target hash value in non-volatile memory, and selecting the random value for use in said one-way hash function based on the index value.

9. The method of claim 8, wherein:
the storing comprises storing in the non-volatile memory identified by the database identifier.

10. The method of claim 9, wherein the receiving from the ADMF comprises a first connection procedure that comprises reception of an X1 protocol message that comprises:
the database identifier,
the random value, and
the index value.

11. The method of claim 8, comprising:
receiving, from the ADMF, a further random value, a further index value and a further target hash value, and wherein:
the storing in volatile memory comprises storing the further random value,
the storing in non-volatile memory comprises storing the further index value and the further target hash value, and
the selecting comprises selecting the further random value for use in said one-way hash function based on the further index value.

12. A lawful interception, LI, administrative function, ADMF, device, comprising input/output circuitry, a processor and a memory, said memory containing instructions executable by said processor whereby said LI ADMF device is operative to:
obtain a random value from a random number generator within a virtual network function, VNF;
obtain an index value that is associated with the random value;
calculate a target hash value using a one-way hash function on a target and the random value, said target identifying a communicating entity that is to be subjected to LI in an intercept access point, IAP, in the VNF,
obtain a database identifier for identifying a non-volatile memory associated with the IAP, and
transmit, to the IAP, the random value, the index value, the database identifier, and the calculated target hash value.

13. The LI ADMF device of claim 12, operative such that the transmitting to the IAP comprises a first connection procedure that comprises transmission of an X1 protocol message that comprises:
the database identifier,
the random value, and
the index value.

14. The LI ADMF device of claim 13, operative such that the transmitting to the IAP comprises a target provisioning procedure that comprises transmission of an X1 protocol message that comprises:
the index value, and
the calculated target hash value.

15. The LI ADMF device of claim 12, operative to:
start, subsequent to the obtaining of the random value, a timer,
obtain, when the timer has expired, a further random value and a further index value, said further index value being associated with the further random value,
calculate a further target hash value using a one-way hash function on the target and the further random value, and
transmit, to the IAP, the further random value, the further index value and the further target hash value.

16. The LI ADMF device of claim 15, operative such that the transmitting to the IAP comprises an updating procedure that comprises transmission of an X1 protocol message that comprises:
the further random value,
the further index value, and
the further target hash value.

* * * * *